(12) United States Patent
Liu et al.

(10) Patent No.: US 12,626,971 B2
(45) Date of Patent: May 12, 2026

(54) COOLING MANIFOLD ASSEMBLIES, CHARGING MODULES, AND CHARGING SYSTEMS

(71) Applicant: Toyota Motor Engineering & Manufacturing North America, Inc., Plano, TX (US)

(72) Inventors: Yanghe Liu, Ann Arbor, MI (US); Feng Zhou, Ann Arbor, MI (US); Hiroshi Ukegawa, South Lyon, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 1015 days.

(21) Appl. No.: 17/830,683

(22) Filed: Jun. 2, 2022

(65) Prior Publication Data

US 2023/0395897 A1 Dec. 7, 2023

(51) Int. Cl.
| | |
|---|---|
| *H01M 10/6568* | (2014.01) |
| *H01M 50/505* | (2021.01) |
| *H01M 10/65* | (2014.01) |
| *H01M 10/656* | (2014.01) |
| *H01M 10/6567* | (2014.01) |

(52) U.S. Cl.
CPC ..... *H01M 10/6568* (2015.04); *H01M 50/505* (2021.01); *H01M 10/65* (2015.04); *H01M 10/656* (2015.04); *H01M 10/6567* (2015.04)

(58) Field of Classification Search
CPC ........... H01M 10/6568; H01M 50/505; H01M 10/6567; H01M 10/656; H01M 10/65
See application file for complete search history.

(56) References Cited

U.S. PATENT DOCUMENTS

| | | | |
|---|---|---|---|
| 10,756,572 B2 | 8/2020 | Ansari et al. | |
| 10,811,740 B2 | 10/2020 | Weicker et al. | |
| 2009/0139781 A1 | 6/2009 | Straubel | |
| 2017/0096073 A1 | 4/2017 | Mardall et al. | |
| 2019/0074727 A1* | 3/2019 | Lee ........................... | H01Q 7/00 |
| 2021/0111439 A1* | 4/2021 | Moen .................. | H01M 10/486 |

FOREIGN PATENT DOCUMENTS

| | | |
|---|---|---|
| CN | 110752638 A | 2/2020 |
| WO | 2021107704 A1 | 6/2021 |

OTHER PUBLICATIONS

Lithium-Ion Battery Packs & Methods of Cooling Them, https://www.dober.com/electric-vehicle-cooling-systems#requirements_for_liquid_coolants, Mar. 14, 2022.

* cited by examiner

*Primary Examiner* — Lingwen R Zeng
(74) *Attorney, Agent, or Firm* — Dinsmore & Shohl LLP

(57) ABSTRACT
A coolant manifold assembly is provided. The coolant manifold assembly may include a manifold body having a coolant delivering channel delivering coolant to a charging module fluidly communicating with the coolant delivering channel, and a coolant receiving channel receiving the coolant from the charging module fluidly communicating with the coolant receiving channel. The coolant manifold further include a bus bar disposed on the manifold body, the bus bar transmits power received from the charging module to a battery.

20 Claims, 4 Drawing Sheets

COOLING MANIFOLD ASSEMBLIES, CHARGING MODULES, AND CHARGING SYSTEMS

TECHNICAL FIELD

The present specification generally relates to wireless charging systems and, more specifically, to assemblies for cooling charging modules.

BACKGROUND

Charging systems of electric vehicles may require increased charging efficiency in limited space. Specifically, wireless high current transmission systems for charging electric vehicles (EVs) may create heat and the limited space of EVs may require efficient cooling systems.

SUMMARY

In one embodiment, a coolant manifold assembly is provided. The coolant manifold assembly may include a manifold body having a coolant delivering channel delivering coolant to a charging module fluidly communicating with the coolant delivering channel, and a coolant receiving channel receiving the coolant from the charging module fluidly communicating with the coolant receiving channel. The coolant manifold assembly further include a bus bar disposed on the manifold body, the bus bar transmitting power received from the charging module to a battery.

In another embodiment, a charging module is provided. The charging modules may include a rectifier electrically connected to a power receiver, the power receiver wirelessly receiving power from a power transmitter, a shield layer disposed between the rectifier and the power receiver and magnetically shielding the rectifier from the power receiver, and a cooler receiving and discharging coolant to remove heat from the charging module, the coolant received from a coolant manifold assembly. The coolant manifold assembly may include a manifold body comprising a coolant delivering channel delivering coolant to the charging module fluidly communicating with the coolant delivering channel and a coolant receiving channel receiving the coolant from the charging module fluidly communicating with the coolant receiving channel, and a bus bar disposed on the manifold body, the bus bar transmitting power received from the charging module to a battery.

In yet another embodiment, a charging system is provided. The charging system may include a charging module. The charging module may include a rectifier electrically connected to a power receiver, the power receiver wirelessly receiving power from a power transmitter, a shield layer disposed between the rectifier and the power receiver and magnetically shielding the rectifier from the power receiver, and a cooler receiving and discharging coolant to remove heat from the charging module, the coolant received from a coolant manifold assembly. The charging system may further include the coolant manifold assembly. The coolant manifold assembly may include a manifold body. The manifold body may include a coolant delivering channel delivering coolant to the charging module fluidly communicating with the coolant delivering channel, and a coolant receiving channel receiving the coolant from the charging module fluidly communicating with the coolant receiving channel. The coolant manifold assembly may further include a bus bar disposed on the manifold body, the bus bar transmitting power received from the charging module to a battery.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure relates generally to cooling assemblies having a coolant manifold to remove heat from a wireless charging module (e.g., a wireless charging receiver used for EV charging) by circulating coolant between the coolant manifold and the charging module. The coolant manifold includes a manifold body having a coolant delivering channel. The coolant is delivered to and received from the charging module, and the coolant is in fluid communication with the coolant receiving channel. The charging module includes a rectifier electrically connected to a power receiver wirelessly receiving power from a power transmitter. A bus bar is disposed on a manifold body of the coolant manifold and transmits the power from the charging module to a battery for charging an EV.

Figure 1:
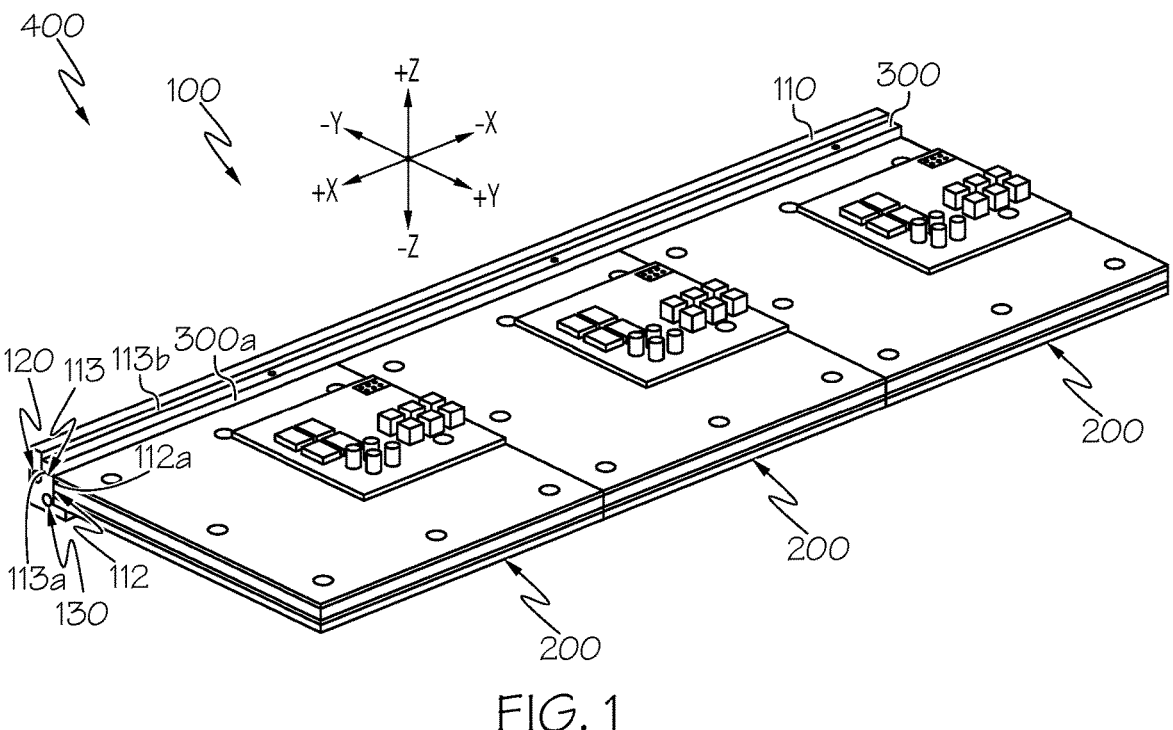
FIG. 1 depicts an illustrative charging system including a cooling manifold coupled to a plurality of charging modules according to one or more embodiments shown and described herein.

Referring to FIG. 1, a charging system 400 is depicted. The charging system 400 includes a coolant manifold assembly 100 and a charging module 200. The coolant manifold assembly 100 may have a manifold body 110 extending longitudinally (a direction of an X coordinate axis). The charging module 200 is disposed on the manifold body 110 at one side and is coupled to the charging module 200. The charging module 200 may be coupled to the manifold body 110 by a coupler (e.g., screw, rivet, linkage, etc.), a bonding material (e.g., a weld, an adhesive, etc.), or the like. In embodiments, a plurality of charging modules 200 are disposed along the manifold body 110 and coupled to the manifold body 110 at one side.

The manifold body 110 has a coolant delivery channel 120 delivering coolant to the charging module 200 and a coolant receiving channel 130 receiving the coolant from the charging module 200. The coolant delivering channel 120 and the coolant receiving channel 130 may extend in the longitudinal direction of the manifold body 110. The coolant delivery channel 120 and the coolant receiving channel 130 may each define a longitudinal bore in the manifold body 110. The coolant delivery channel 120 and the coolant receiving channel may be indirectly coupled to each other. For example, the coolant may flow from the coolant delivery channel 120 to the coolant receiving channel 130 via the charging module 200. In such case, the fluid communication may be provided between the coolant delivery channel 120 and the coolant receiving channel 130 when the charging module 200 is coupled to the manifold body 110. The coolant delivery channel 120 and the coolant receiving channel 130 are coupled to a coolant drive to pump the coolant there through. The coolant drive may be coupled to a coolant reservoir to supply the coolant to the charging modules 200.

The coolant in the manifold body 110, specifically the coolant in the coolant delivery channel 120 and the coolant receiving channel 130, is in fluid communication to the charging modules 200. The coolant manifold assembly 100 may deliver coolant to the charging modules 200 and may receive the coolant from the charging modules 200 after heat from the charging modules 200 is transferred to the coolant. The coolant may be a conductive coolant or a non-conductive coolant (e.g., a dielectric fluid). The manifold body 110 may be formed from a non-conductive material such as polyether ether ketone (PEEK), high temperature PEEK, fiberglass, or the like.

The charging modules 200 may be disposed along the longitudinal direction of the manifold body 110. The manifold body 110 may receive the charging modules 200 at a charging module receiving portion 112. The charging module receiving portion 112 may be a cut out that supports a side portion and a bottom portion of each of the charging modules 200. In embodiments, the charging modules 200 may be disposed on both sides, one side facing the +Y direction of the depicted coordinate axes and the other side facing the −Y direction of the depicted coordinate axes) of the manifold body 110.

The coolant manifold assembly 100 includes a bus bar 300. The bus bar 300 may transmit power from the charging modules 200 to a battery of an EV (e.g., hybrid electrical vehicles, plug-in hybrid electric vehicles, fuel cell vehicles, and electric vehicles). The bus bar 300 may be a DC bus bar. In addition to providing cooling fluid to the charging modules 200 as described herein, the coolant manifold assembly 100 may further remove heat generated by the bus bar 300. The bus bar 300 may extend longitudinally along the manifold body 110 and disposed on the manifold body 110.

The manifold body 110 may receive the bus bar 300 at a bus bar receiving portion 113. The bus bar receiving portion 113 may be a cut out formed on a top portion of the manifold body 110. The bus bar receiving portion 113 has a first side 113a facing in the +Z direction of the depicted coordinate axes and a second side 113b facing in the +Y direction of the depicted coordinate axes. The bus bar receiving portion 113 supports a side portion of the bus bar 300 on the second side 113b and supports a bottom portion of the bus bar 300 on the first side 113a. The bus bar 300 may contact the manifold body 110 at the side portion and the bottom portion which may allow heat to be removed from the bus bar 300 as described herein.

In embodiments, the first side 113a may be substantially coplanar with the top surface of a cooler 230. In embodiments, the bus bar receiving portion 113 may be disposed on the +Z coordinate axis direction side than the coolant delivery channel 120 and the coolant receiving channel 130. This configuration may establish a clearance between the receiving portion 113 and the coolant delivery channel 120 and the coolant receiving channel 130.

In embodiments, a side 300a of the bus bar 300 facing in the +Y direction of the depicted coordinate axes may be substantially coplanar with a side 112a of the charging module receiving portion 112 facing in the +Y direction of the depicted coordinate axes. This configuration may increase assembly efficiency by reducing interference between the bus bar 300 and the charging modules 200. At the same time, the bus bar 300 disposed close to the charging modules 200 may increase power transmittal efficiency by reducing the distance between the bus bar 300 and the charging modules 200.

The bus bar 300 may be electrically coupled to the charging modules 200 via one or more connectors such as a wire, a short bus bar, a quick clamp, a power plug, or the like. The connectors may be flexible to bend and twist to contour to the charging modules 200 or other adjacent components to save space in a limited space surrounding the charging system 400. The bus bar 300 may be formed of copper, steel, or any materials that may transmit electric power. In embodiments, the bus bar 300 may be encapsulated by a cover and dielectric coolant may be injected between the cover and the bus bar 300 for improved heat (e.g., joule heat) removal. The bus bar 300 may be further electrically coupled to a battery to transmit power received from the charging modules 200 to the battery. The battery may supply power to EVs.

Figure 2:
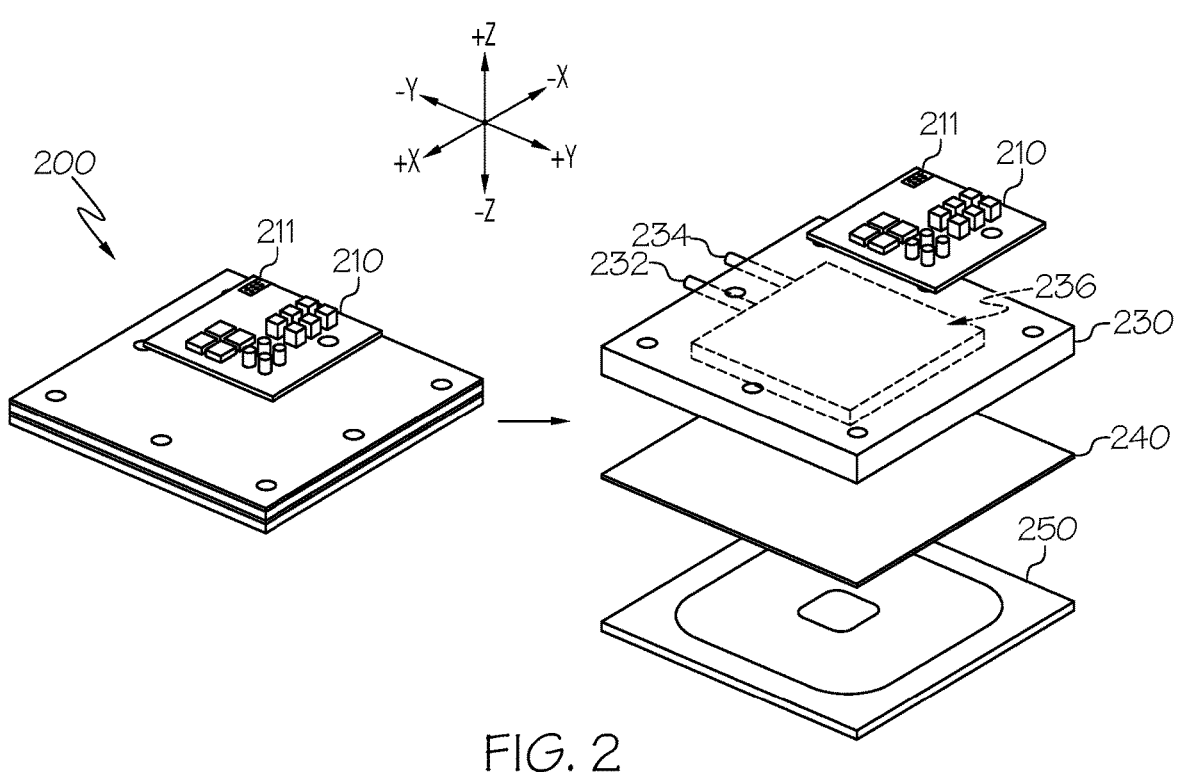
FIG. 2 depicts an illustrative charging module and an exploded view of the same according to one or more embodiments shown and described herein.

Referring to FIG. 2, the charging module 200 may have a rectifier 210, the cooler 230, a shield layer 240, and a power receiver 250. The charging module 200 may include a greater or fewer number of layers without departing from the scope of the present disclosure.

The rectifier 210 may include at least one diode to transform alternating current (AC) power to direct current (DC) power. The rectifier 210 may be a bridge rectifier with multiple diodes. The rectifier 210 may further include a resistor, a capacitor, an inductor, an oscillator, a transistor, an integrated circuit, a switch, a terminal, or the like. The rectifier 210 may receiver AC power from the power receiver 250 and convert AC power to DC power to supply the converted DC power to any suitable electronic device. For example, DC power may be supplied to charge a battery for an EV. The battery may be a lithium battery, nickel-metal hydride battery, or any rechargeable batteries. Other electronic or semiconductor devices generating heat may be disposed on the cooler 230 in addition to the rectifier 210.

The cooler 230 may be disposed under the rectifier 210 to remove heat from the rectifier 210, the power receiver 250, and/or the various components of the charging module 200. The cooler 230 may have an inlet port 232 and an outlet port 234. The inlet port 232 may be fluidly coupled to the coolant delivery channel 120 of the manifold body 110 to receive coolant there through from the coolant delivery channel 120. The outlet port 234 may be fluidly coupled to the coolant receiving channel 130 of the manifold body 110 to discharge the coolant there through to the coolant receiving channel 130. The cooler 230 may have one or more channels 236 formed therein and the coolant may circulate in the one or more channels 236.

The cooler 230 is thermally coupled to various heat generating components (e.g., a rectifier 210, a power receiver 250, or the like) of the charging modules 200 including the rectifier 210 and the power receiver 250 via, for example, conduction, convection, and/or radiation. A body of the cooler 230 may be formed with metal or any heat conductive material which may receive heat transferred from the various heat generating components. For example, the cooler 230 may be come in contact directly or indirectly with the various heat generating components, and the heat may transfer from the heat generating components to the body of the cooler 230. The heat is further transferred from the body of the cooler 230 to the coolant flows through the one or more channels 236 formed in the cooler 230. The heat may also be released into the ambient air surrounding the cooler 230.

The channels 236 may be formed in one layer of the cooler 230 and a cover may cover the layer to seal the cooler 230. In embodiments, the channels 236 may be integrally formed within the cooler 230. The channels 236 may be micro channels to increase heat transfer property of the cooler 230. The channels 236 may be formed to change flow direction of the coolant within the cooler 230 to allow the coolant flowed in from the inlet port 232 to circulate inside the cooler 230 and be directed toward the outlet port 234. Thermal mixing may occur in the cooler 230 which may increase hear transfer by convection.

The power receiver 250 may wirelessly receive power from a power transmitter. The power receiver 250 may be a printed circuit board (PCB) having a wire or coil induces a magnetic field to wirelessly transmit power across air. The wire or coil may be formed by a copper. The PCB may be formed from one or more conductive layers (e.g., copper, aluminum, silver, nickel, any combination thereof, or the like) and/or one or more layers of non-conductive substrates (e.g., dielectric polymer layers). The wire may be disposed densely to increase surface area to reduce power loss when transmitting power at a high frequency, which may create heat. The power receiver 250 may be electrically connected to the rectifier 210 to transmit AC power through one or more contacts 251. The one or more contacts 251 may be electrically connected to one or more contacts 211 of the rectifier 210 via one or more connectors.

The shield layer 240 may be disposed between the cooler 230 and the power receiver 250. The shield layer 240 may be formed with ferrite materials or other materials providing magnetic shielding. The shield layer 240 may prevent electromagnetic interferences between the power receiver 250 and the rectifier 210. Therefore, in embodiments, the shield layer 240 may be disposed between the rectifier 210 and the cooler 230 or anywhere between the power receiver 250 and the rectifier 210.

Figures 3A, 3B:
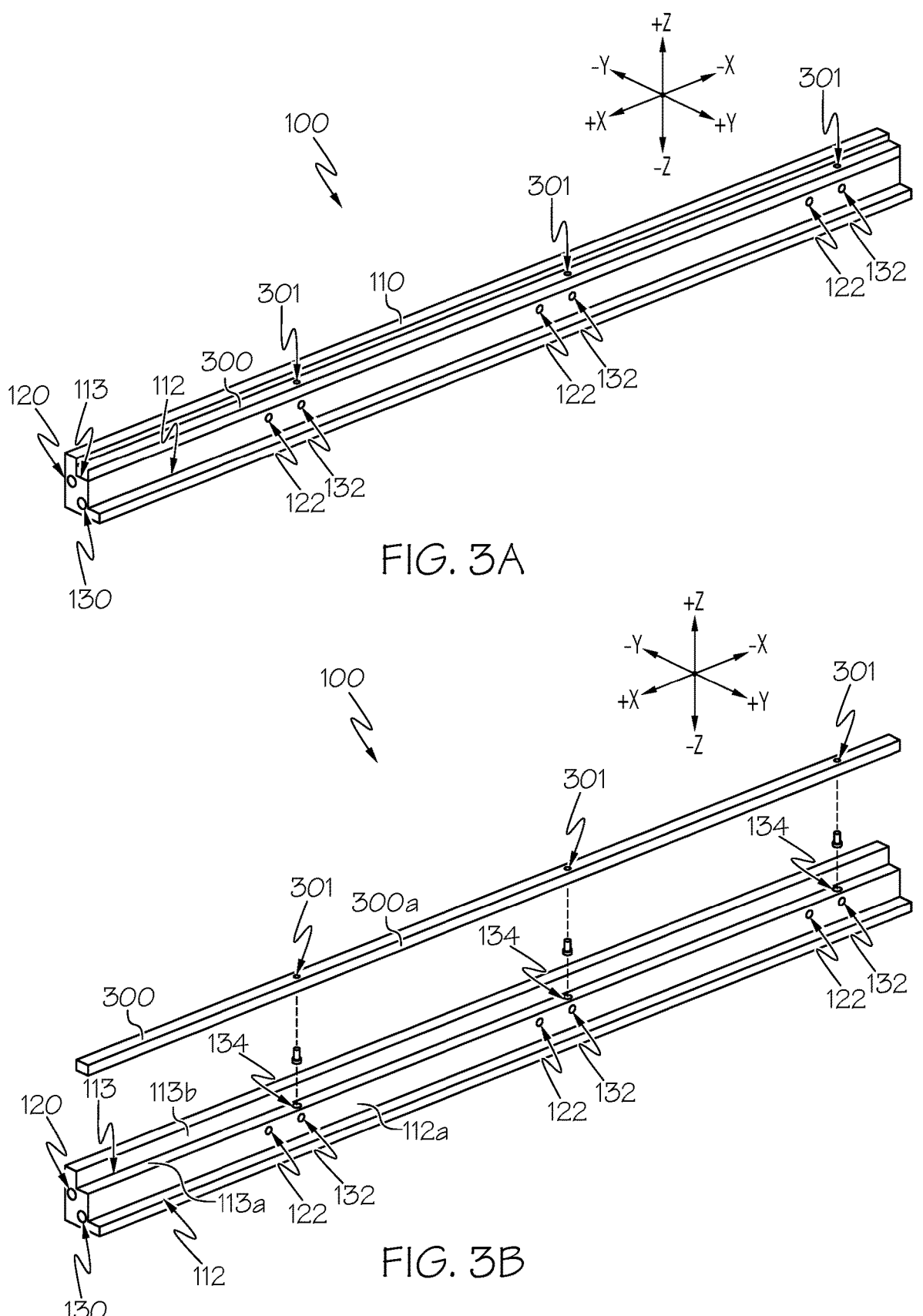
FIG. 3A depicts an illustrative cooling manifold according to one or more embodiments shown and described herein.
FIG. 3B depicts an exploded view of the cooling manifold of FIG. 3A according to one or more embodiments shown and described herein.

Referring to FIG. 3A, the coolant manifold assembly 100 is depicted. The coolant manifold assembly may have the manifold body 110 defining one or more lateral delivery openings 122 and one or more lateral receiving openings 132. The lateral delivery openings 122 may be in fluid communication with the coolant delivery channel 120. The lateral receiving openings 132 may be in fluid communication with the coolant receiving channel 130. The coolant delivery channel 120 may extend in the longitudinal direction of the manifold body 110 such that the lateral delivery openings 122 disposed along the longitudinal direction are fluidly connected to the coolant delivery channel 120. Similarly, the coolant receiving channel 130 may be extended in the longitudinal direction of the manifold body 110 such that the lateral receiving openings 132 disposed along the longitudinal direction are fluidly connected to the coolant receiving channel 130.

Referring to FIG. 3B, an exploded view of the coolant manifold assembly 100 is depicted. The bus bar 300 may define one or more holes 301, each of which may receive a pin 310 to connect the bus bar 300 and the manifold body 110. The bus bar receiving portion 113 may be formed as an L-shaped cut out or a step to receive the bus bar 300. The bus bar 300 may abut the bus bar receiving portion 113 and heat generated from the bus bar 300 while transmitting power may be removed through the manifold body 110.

The manifold body 110 may further define one or more vertical openings 134 (i.e., openings extends in a direction of the coordinate axis Z) disposed along the longitudinal direction (i.e., a direction of the coordinate axis Y) of the manifold body 110. Each of the vertical openings 134 may be configured to receive a pin 310 connecting the bus bar 300 and the manifold body 110. The vertical openings 134 may not be limited to vertical openings, but also be angled or otherwise configured to receive the pin 310. The pins 310 may each be inserted into respective vertical openings 134. In embodiments, the pins 310 may constitute plugs for the vertical openings 134 to prevent leakage of the coolant. The pins 310 may be in direct or thermal contact with the coolant, and therefore, the pins 310 may remove heat from the bus bar 300. The heat from the bus bar 300 may be transferred to the pins 310 via a thermal coupling to the bus bar 300. The pins 310, by contacting the coolant, may allow for the heat to further transfer to the coolant. In case when the pins 310 are removed from the vertical openings 134, the vertical openings 134 may be in fluid communication with the coolant receiving channel 130. In embodiments, the vertical openings 134 may not be in fluid communication with the coolant receiving channel 130. The pins 310 still may remove heat from the bus bar 300 by being in thermal contact.

The manifold body 110 may be either partially or entirely formed with metal or any heat conductive material which may receive heat transferred from the various heat generating components. For example, the manifold body 110 may contact (e.g., directly or indirectly) with the various heat generating components (e.g., bus bar 300, charging module 200, or the like) and the heat may transfer from the heat generating components to the manifold body 110. The heat is further transferred from the manifold body 110 to the coolant that flows through the coolant delivery channel 120 and the coolant receiving channel 130 formed in the manifold body 110. The heat may also be released into the ambient air surrounding the manifold body 110.

The charging module receiving portion 112 may be formed as an L-shaped cut out or a step to receive the charging modules 200. The charging modules 200 may abut the charging module receiving portion 112 and heat generated from the charging modules 200 while transmitting and/or converting power may be removed through the manifold body 110. The heat may be generated from the rectifier 210 which is thermally coupled to the cooler 230. The cooler 230 is thermally coupled to the manifold body 110, and therefore, the heat from the rectifier 210 is transferred to the manifold body 110. The heat generated from the power receiver 250 may be transferred to the cooler 230 and also to the manifold body 110 by being thermally coupled.

Figures 4A, 4B:
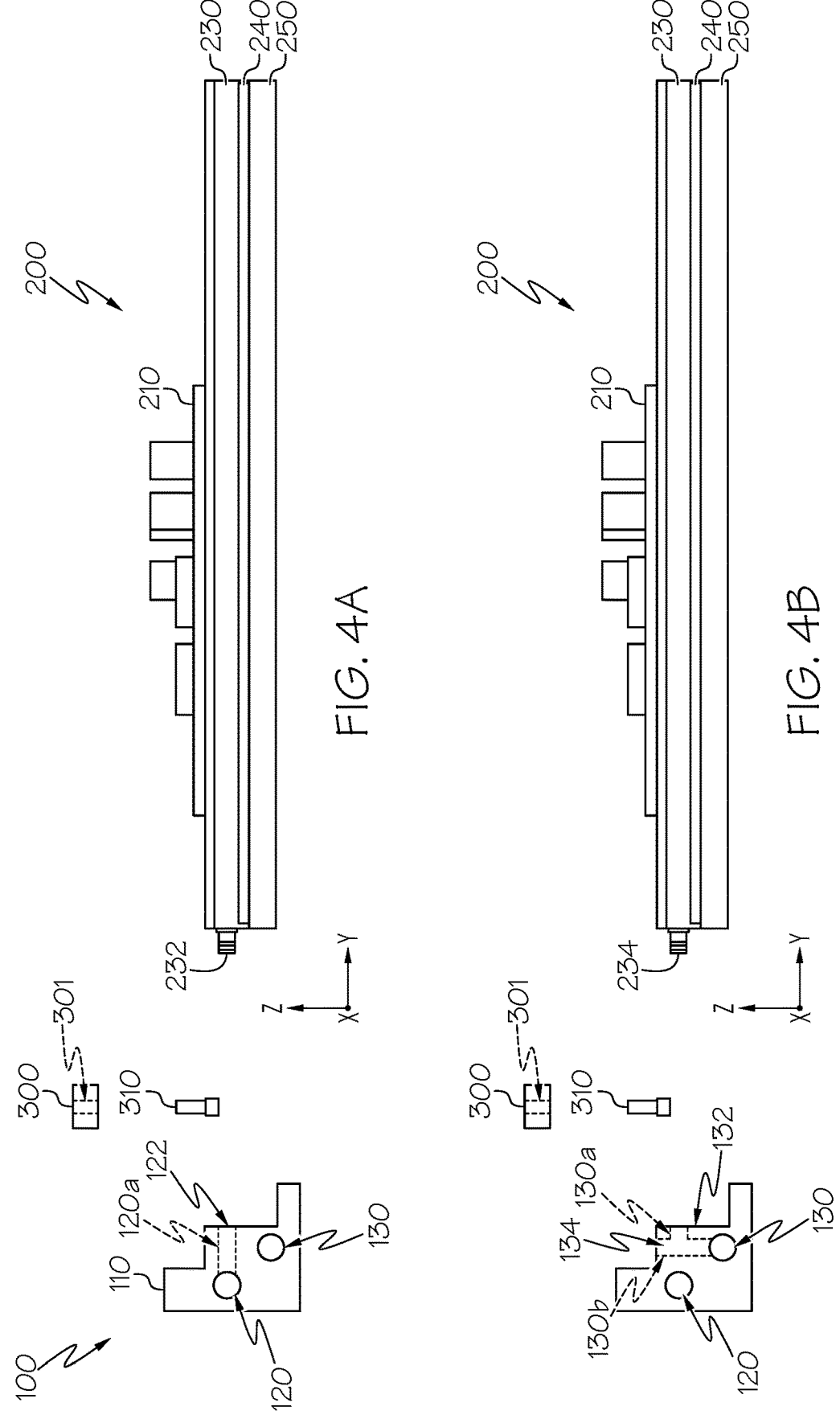
FIG. 4A depicts an exploded side view of the cooling manifold of FIG. 3A with hidden lines focusing on a coolant delivering channel and the charging module according to one or more embodiments shown and described herein.
FIG. 4B depicts an exploded side view of the cooling manifold of FIG. 3A with hidden lines focusing on a coolant receiving channel and the charging module according to one or more embodiments shown and described herein.

Referring to FIG. 4A, an exploded side view of the charging module 200 and the coolant manifold assembly 100 with hidden lines focusing on the coolant delivery channel 120 is depicted. The inlet port 232 of the charging module 200 may be configured to be inserted into a lateral portion 120a of the coolant delivery channel 120 through the lateral delivery opening 122. The lateral portion 120a extends in a lateral direction of the coolant manifold assembly 100 and disposed over the coolant receiving channel 130. In embodiments, the lateral portion 120a may be angled, bent, or curved to allow accessibility to the delivery opening 122 in case when the coolant delivery channel 120 is not disposed at the same level in the Z direction of the depicted coordinate axes as the lateral delivery opening 122 or other configurations that allow access to the delivery opening 122.

As can be seen from the side view, the coolant delivery channel 120 and the coolant receiving channel 130 are disposed away from each other in the lateral direction and a vertical direction of the coolant manifold assembly 100. The space between the coolant delivery channel 120 and the coolant receiving channel 130 may reduce thermal influence from each other. In other words, the heat from the coolant receiving channel 130 may be transferred to the manifold body 110 and thus reduce the thermal influence from the coolant receiving channel 130 to the coolant delivery channel 120. Also, in case the manifold body 110 is formed from an insulative material or the insulative material is at least partially disposed between the coolant delivery channel 120 and the coolant receiving channel 130, the insulative material may shield thermal influence between the coolant delivery channel 120 and the coolant receiving channel 130.

Referring to FIG. 4B, an exploded side view of the charging module 200 and the coolant manifold assembly 100 with hidden lines focusing on the coolant receiving channel 130 is depicted. The outlet port 234 of the charging module 200 may be configured to be inserted into a lateral portion 130a of the coolant receiving channel 130 through the lateral receiving opening 132. The lateral portion 130a extends in a lateral direction of the coolant manifold assembly 100 and disposed at the same level with the lateral portion 120a of the coolant delivery channel 120. Therefore, the lateral portion 130a and the lateral portion 120a are overlapped when viewed from a lateral end side of the coolant manifold assembly 100. In embodiments, the lateral portion 130a may be disposed in a manner not overlapped with the lateral portion 120a when viewed from the lateral end side of the coolant manifold assembly 100. The lateral portion 130a may be angled, bent, or curved to allow access to lateral receiving opening 132 as long as the lateral portion 130a is fluidly communicated with the coolant receiving channel 130 or other configurations that allow access to the lateral receiving opening 132.

The coolant receiving channel 130 may further include a vertical portion 130b extending in a vertical direction (i.e., Z direction of the depicted coordinate axes) of the coolant manifold assembly 100. The vertical portion 130b is fluidly communicated with the lateral portion 130a. The vertical portion 130b may be angled, bent, or curved when the coolant receiving channel 130 is not disposed at the same location in a horizontal direction (i.e., Y direction of the depicted coordinate axes) as the vertical opening 134 or other configurations that requires adjustment of the vertical portion 130b to allow access to the vertical opening 134.

In embodiments, the vertical portion 130b may extend all the way through the vertical opening 134. The pin 310 may plug the vertical opening 134 to seal the coolant receiving channel to prevent coolant leakage. The pin 310 may have a head portion 310a inserted through the vertical opening 134 and have a column portion 310b to support the bus bar 300 by being inserted into the hole 301. The column portion 310b may be inserted into the hole 301. The coolant may be in contact with the head portion 310a.

In embodiments, the vertical portion 130b may extend to reach the lateral portion 130a but not connected to the vertical opening 134. The head portion 310a of the pin 310 may be inserted into the vertical opening 134. The coolant may not be in contact with the pin 310. The fluid communication still exists between the lateral portion 130a and the vertical portion 130b.

Figure 5:
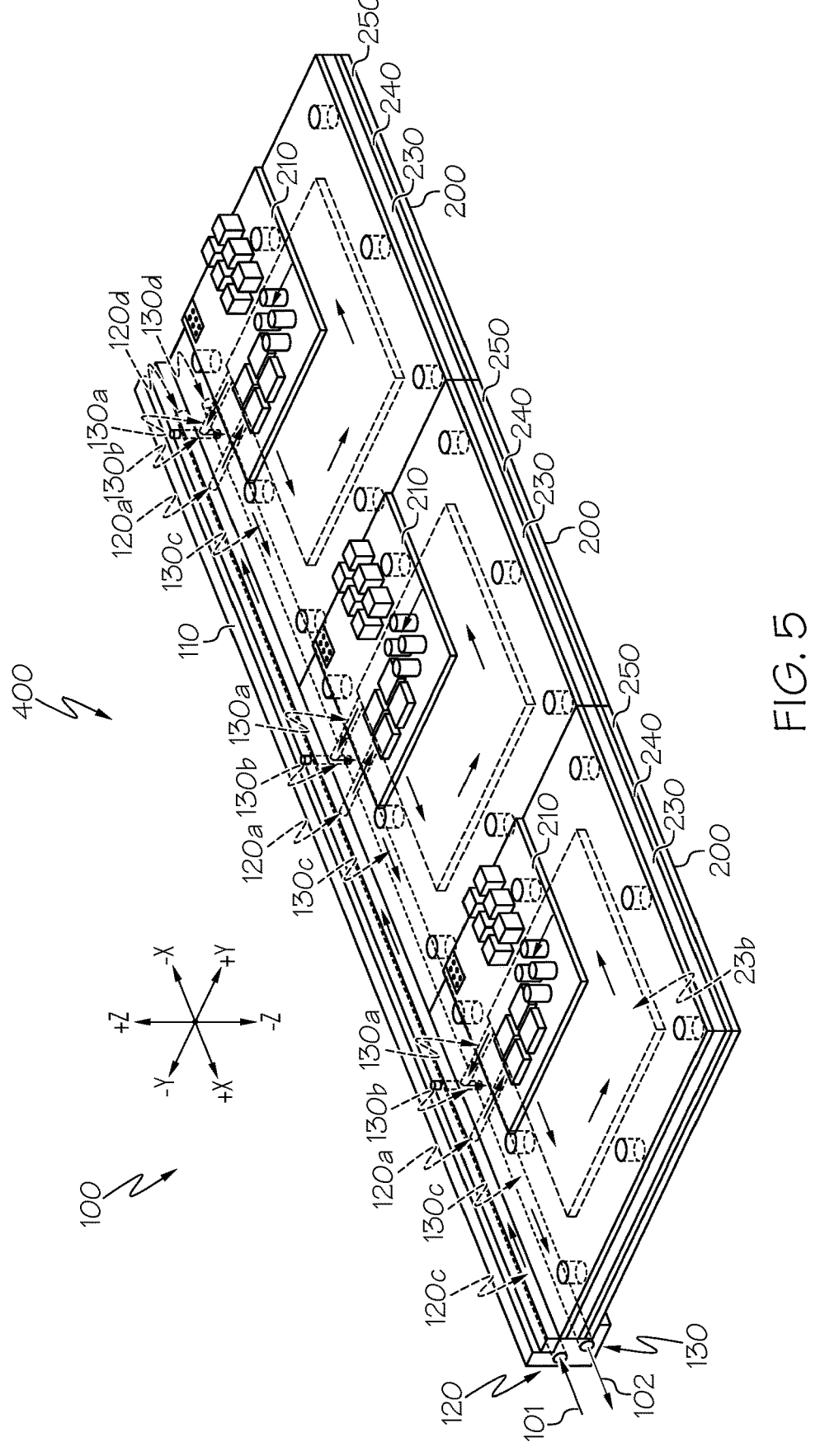
FIG. 5 depicts a perspective view of an illustrative charging system, showing a flow of coolant flowing between the cooling manifold and the charging module according to one or more embodiments shown and described herein.

Referring to FIG. 5, the coolant flow in the charging system 400 is depicted. The coolant manifold assembly 100 may be coupled to a coolant driver to pump the coolant through the manifold body 110. The coolant driver may be a pump, compressor, or the like circulates coolant through the manifold body 110. The coolant driver may generate flow in a first direction 101 through a longitudinal portion 120c of the coolant delivery channel 120. The coolant driver may generate flow in a second direction 102 through a longitudinal portion 130c of the coolant receiving channel 130.

The coolant may flow in the first direction 101 through the longitudinal portion 120c and then in the lateral direction through the lateral portion 120a toward the cooler 230. The coolant flows into the channel 236 via the inlet port 232 of the cooler 230. The channel 236 may include a plurality of channels to circulate the coolant in the cooler 230. After circulating in the channel 236 the coolant flow out from the cooler 230 via the outlet port 234 of the cooler 230. The outlet port 234 may be coupled to the lateral portion 130a of the coolant receiving channel 130. The coolant may flow in the lateral direction toward the coolant manifold assembly 100. The coolant further may flow in the vertical direction down toward the longitudinal portion 130c of the coolant receiving channel 130. In the coolant receiving channel 130, the coolant may flow in the second direction 102 and flows out from the coolant manifold assembly 100.

The coolant manifold assembly 100 may be coupled to a heat exchanger, which may cool the coolant. The heat exchanger may be, for example, a radiator or the like. The coolant driver may drive the coolant back to the coolant manifold assembly 100 through the coolant delivery channel 120. When the coolant flows in the first direction 101 and flows out in the second direction 102 opposite to the first direction 101, the coolant driver and the heat exchanger may be disposed in the same side, which may allow the charging system 400 to be compact. However, the first direction 101 and the second direction 102 are not limited to the opposite direction. In embodiments, the first direction 101 and the second direction 102 may be the same direction. The same direction configuration may require additional room to send the coolant flows out from one end back to the other end to circulate the coolant in the system.

The coolant manifold assembly 100 may be coupled to a plurality of charging modules 200. The charging modules 200 may be disposed along the longitudinal direction of the coolant manifold assembly 100. Each of the charging modules 200 may be coupled to the coolant manifold assembly 100 and the coolant may flow in and out from respective the cooler 230 of the each of the charging modules 200. The horizontal configuration of the charging modules 200 may reduce the overall thickness of the charging system 400, thereby providing a lower volume profile as compared to conventional charging systems.

In embodiments, the coolant delivery channel 120 may have a longitudinal end portion 120d, and the coolant receiving channel 130 may have a longitudinal end portion 130d at an longitudinal end portion of the coolant manifold assembly 100. The longitudinal end portion 120d and the longitudinal end portion 130d may be closed. When closed, the pressure in the coolant manifold may increase and the coolant may be forced to be circulated into the cooler 230 and flows out from the coolant manifold assembly 100. The battery may be disposed at the closed end side of the coolant manifold assembly 100.

In embodiments, the length of the coolant manifold assembly 100 may be adjusted to receive different number of charging modules 200. In embodiments, the longitudinal end portion 120d and the longitudinal end portion 130d may be opened and another coolant manifold assembly may be disposed along the longitudinal direction. The coolant manifold assembly 100 may be in fluid communication with the other coolant manifold assembly.

As described herein above, it is understood that the charging system 400 may provide a heat removing system for the various components of the charging system 400. Heat may be generated from the charging modules 200 including the rectifier 210 and the power receiver 250 and the bus bar 300, and the heat may be removed by the coolant flows through the coolant manifold assembly 100.

It should be understood now that a cooling assembly having a coolant manifold provides a system to remove heat from a charging module by circulating coolant between the coolant manifold and the charging module. The coolant manifold includes a manifold body having a coolant delivering channel. The coolant is delivered through the coolant delivering channel and flows into one or more channels in a cooler of the charging module. The heat from a heat generating components of the charging module, such as a rectifier and a power receiver, is transferred to the coolant. The coolant further flows to a coolant receiving channel. A bus bar is disposed on a manifold body of the coolant manifold and transmits the power from the charging module to a battery for charging a vehicle. Heat generated from the bus bar may also be transferred to the coolant. The manifold body also may release the heat to the ambient air surrounding the manifold body. The cooling assembly may provide a compact or a space saving configuration for a limited space in a vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A coolant manifold assembly, comprising:
a manifold body defining:
    a coolant delivering channel fluidly coupled to a charging module for delivering coolant to the charging module, a coolant receiving channel fluidly coupled to the charging module to receive the coolant from the charging module, and
an opening;
a bus bar disposed on the manifold body, the bus bar transmitting power received from the charging module to a battery; and
a thermal pin received in the opening of the manifold body and thermally coupling the bus bar to the coolant.

2. The coolant manifold assembly of claim 1, wherein the manifold body extends in a longitudinal direction.

3. The coolant manifold assembly of claim 1, wherein the coolant manifold assembly is coupled to a coolant driver to pump the coolant, and the coolant driver drives flow in a first direction through a longitudinal portion of the coolant delivering channel and drives flow in a second direction opposite to the first direction through a longitudinal portion of the coolant receiving channel.

4. The coolant manifold assembly of claim 1, wherein the coolant receiving channel has a longitudinal portion extending longitudinally, a vertical portion extending vertically from the longitudinal portion toward a lateral portion, and the lateral portion extending toward the charging module.

5. The coolant manifold assembly of claim 1, wherein the bus bar extends longitudinally along the manifold body.

6. The coolant manifold assembly of claim 1, wherein the bus bar is electrically coupled to the charging module and the battery via one or more connectors.

7. The coolant manifold assembly of claim 1, wherein;
the opening is fluidly coupled to the coolant receiving channel, and
the thermal pin seals the opening.

8. A charging module, comprising:
a power receiver wirelessly receiving power from a power transmitter;
a rectifier electrically connected to the power receiver;
a shield layer disposed between the rectifier and the power receiver and magnetically shielding the rectifier from the power receiver; and
a cooler receiving and discharging coolant to remove heat from the charging module, the coolant received from a coolant manifold assembly,
wherein the coolant manifold assembly comprises a manifold body defining a coolant delivering channel fluidly coupled to the charging module, a coolant receiving channel fluidly coupled to the charging module, and an opening for receiving a thermal pin, and
wherein a bus bar disposed on the manifold body and thermally coupled to the coolant in the coolant manifold assembly via the thermal pin is configured to transmit power received from the charging module to a battery.

9. The charging module of claim 8, wherein the coolant manifold assembly is coupled to a coolant driver to pump the coolant, and the coolant driver drives flow in a first direction through a longitudinal portion of the coolant delivering channel and drives flow in a second direction opposite to the first direction through a longitudinal portion of the coolant receiving channel.

10. The charging module of claim 8, wherein the rectifier is electrically connected to the bus bar and the battery via one or more connectors.

11. The charging module of claim 8, wherein the power receiver is a printed circuit board.

12. The charging module of claim 8, wherein the cooler is disposed between the rectifier and the shield layer.

13. A charging system, comprising:
a charging module, comprising:
   a power receiver wirelessly receiving power from a power transmitter,
   a rectifier electrically connected to the power receiver,
   a shield layer disposed between the rectifier and the power receiver and magnetically shielding the rectifier from the power receiver, and
   a cooler receiving and discharging coolant to remove heat from the charging module; and
a coolant manifold assembly fluidly coupled to the cooler, the coolant manifold assembly comprising:
   a manifold body defining:
      a coolant delivering channel delivering the coolant to the charging module, and
      a coolant receiving channel receiving the coolant from the charging module, and
      an opening;
   a bus bar disposed on the manifold body, the bus bar transmitting power received from the charging module to a battery; and
   a thermal pin received in the opening of the manifold body and thermally coupling the bus bar to the coolant.

14. The charging system of claim 13, wherein the manifold body extends in a longitudinal direction.

15. The charging system of claim 13, wherein the coolant receiving channel has a longitudinal portion extending longitudinally, a vertical portion extending vertically from the longitudinal portion toward a lateral portion, and the lateral portion extending toward the cooler.

16. The charging system of claim 13, wherein the coolant manifold assembly is coupled to a coolant driver to pump the coolant, and the coolant driver drives flow in a first direction through a longitudinal portion of the coolant delivering channel and drives flow in a second direction opposite to the first direction through a longitudinal portion of the coolant receiving channel.

17. The charging system of claim 13, wherein the rectifier electrically connected to the bus bar and the battery via one or more connectors.

18. The charging system of claim 13, wherein the cooler is disposed between the rectifier and the shield layer.

19. The coolant manifold assembly of claim 1, wherein the thermal pin is shaped and sized to correspond to the opening to seal the opening.

20. The coolant manifold assembly of claim 2, wherein the opening of the manifold body is a vertical opening transverse to the longitudinal direction.

* * * * *